W. L. FITZGERALD.
HARROW.
APPLICATION FILED OCT. 29, 1913.
1,099,290.
Patented June 9, 1914.
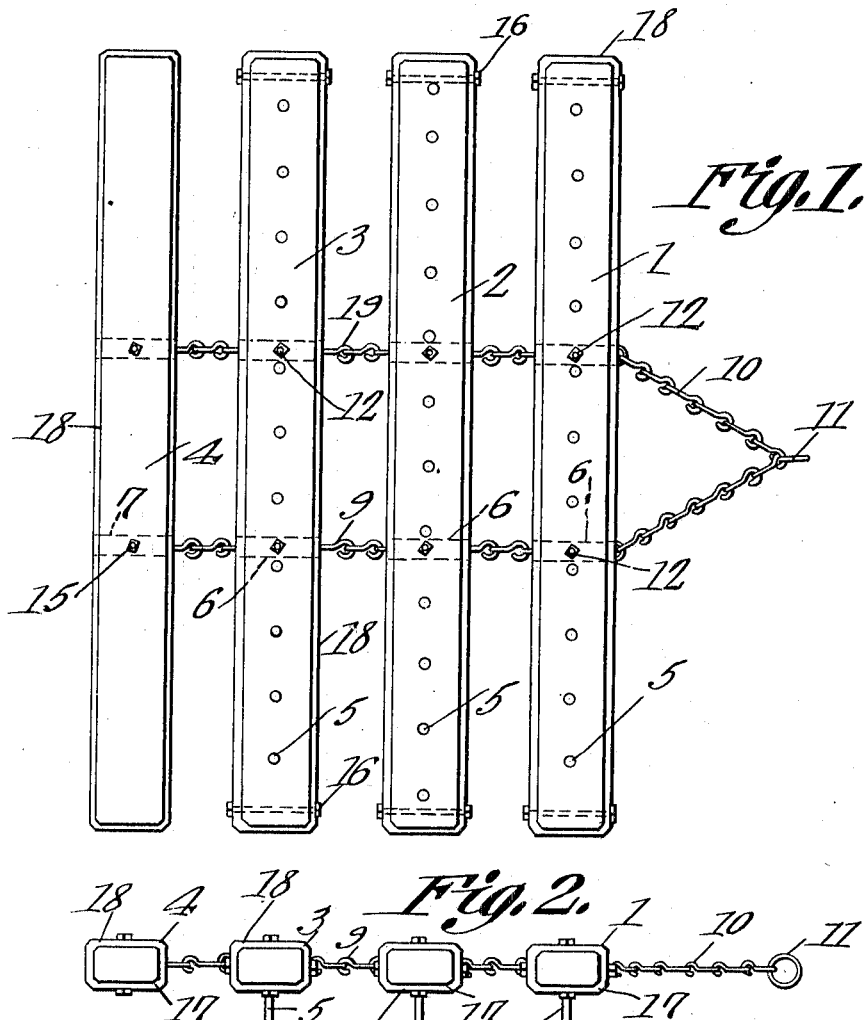
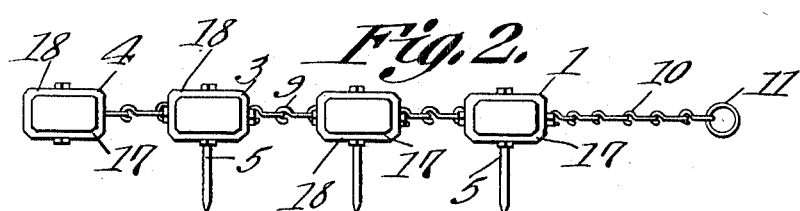
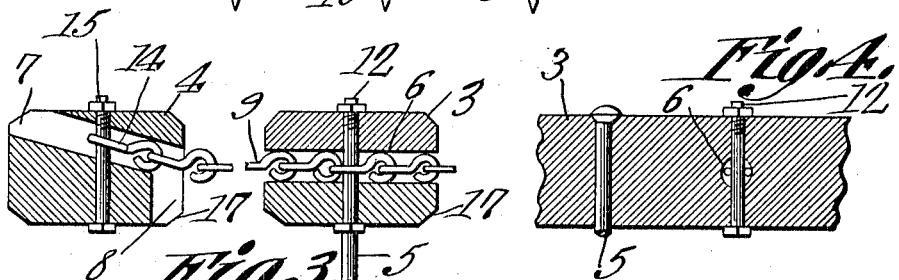

UNITED STATES PATENT OFFICE.

WILLIAM L. FITZGERALD, OF WAYNESBORO, MISSISSIPPI.

HARROW.

1,099,290.

Specification of Letters Patent.

Patented June 9, 1914.

Application filed October 29, 1913. Serial No. 798,131.

*To all whom it may concern:*

Be it known that I, WILLIAM L. FITZGERALD, a citizen of the United States, residing at Waynesboro, in the county of Wayne and State of Mississippi, have invented a new and useful Harrow, of which the following is a specification.

The device forming the subject matter of this application is a harrow, and one object of the invention is to provide a device of this type which will leave the soil in the rear of the harrow in a smooth and compact condition.

Another object of the invention is to provide a harrow the constituent bars of which may move freely with respect to each other.

Another object of the invention is to provide novel means for connecting the chains of the harrow with the bars thereof.

Another object of the invention is to provide novel means whereby the rearmost bar, or drag bar, will assume a proper position with respect to the soil.

It is within the scope of the invention to improve generally and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawing:—Figure 1 is a top plan; Fig. 2 is a side elevation; Fig. 3 is a fragmental transverse section taken through a pair of the bars of the harrow; and Fig. 4 is a fragmental longitudinal section of one of the bars of the harrow.

The harrow herein disclosed may comprise any desired number of bars, and the bars may be of any dimensions. In the present instance four bars are shown the same being noted by the reference characters 1, 2, 3 and 4. The bars 1, 2 and 3 are provided with teeth 5, but there are no teeth upon the rearmost bar 4, the latter bar constituting a drag bar, adapted to smooth down the soil.

The bars 1, 2, 3 and 4 are provided with transverse openings 6 which are parallel to the upper and lower faces of the bars. In the rearmost or drag bar 4 there are formed openings 7 which slant downwardly and forwardly. In the forward, lower edge of the drag bar 4 are fashioned recesses 8 which open into the forward ends of the openings 7. Chains 9 are located in the openings 6 of the bars 1, 2 and 3, the chains 9 converging as indicated at 10 in front of the bar 1, into union with a ring 11 or other suitable means for receiving a draft-rigging. Bolts 12 extend through the bars 1, 2 and 3 and intersect the openings 6, the bolts 12 passing through certain of the links of the chains 9 to hold the chains in the openings 6. The rear links 14 of the chains 9 lie in the openings 7 of the drag bar 4 and are held therein by bolts 15. Bolts 16 may be passed horizontally through the bars 1, 2 and 3, to prevent the same from splitting. The forward edges of all of the bars are beveled as indicated at 17, the bars being beveled upon their end faces and about their peripheries as shown at 18.

The construction of the harrow herein disclosed is such that each bar will be permitted to move independently of any other bar, and owing to the fact that the bars are beveled as indicated at 17, the bars will coöperate properly with the soil when the harrow is drawn forwardly. Further, because the bars are beveled at their ends, as shown at 18, the bars will coöperate properly with the soil, when the bars move endwise with respect to each other.

Owing to the fact that the opening 7 in the drag bar 4 is rearwardly and upwardly inclined, and owing to the fact that the forward end of each opening 7 communicates with one of the recesses 8, the drag bar 5, when the harrow is moved forwardly, will assume an upward inclination with respect to the surface of the soil, thereby facilitating the compacting of the soil.

Having thus described the invention, what is claimed is:—

1. A harrow comprising a toothed bar and a toothless drag bar located to the rear of the toothed bar, the bars having transverse openings; and flexible elements secured in the openings; the openings in the drag bar being upwardly and rearwardly inclined, whereby the drag bar will assume an upward and forward slope in the direction of the draft.

2. A harrow comprising a toothed bar and a toothless drag bar located to the rear of the toothed bar, the bars having transverse openings; and flexible elements secured in the openings; the openings in the drag bar being upwardly and rearwardly inclined and the drag bar having recesses in its lower, forward edge communicating with the openings, whereby the drag bar will assume an upward and forward slope in the direction of the draft.

3. A harrow comprising a plurality of bars; and teeth carried by the bars; the bars being adapted to ride upon the surface of the soil and to effect a packing thereof; and flexible elements connecting the bars, the bars being movable with respect to each other, both vertically and in the direction of their lengths, the bars being beveled upon their forward edges and upon their ends for coöperation with the soil, both when the harrow is drawn forwardly and when the bars move longitudinally with respect to each other.

4. A harrow comprising a plurality of bars having transverse openings therein; chains located in the openings; and securing devices mounted in the bars and intersecting the openings, the securing devices passing through certain links of the chains.

In testimony that I claim the foregoing as my own, I have hereto affixed my signature in the presence of two witnesses.

WILLIAM L. FITZGERALD.

Witnesses:
W. W. STROUP,
L. L. KERR.

Copies of this patent may be obtained for five cents each, by addressing the "Commissioner of Patents, Washington, D. C."